United States Patent [19]

Lebesgue et al.

[11] 4,253,966
[45] Mar. 3, 1981

[54] PROCESS FOR BIOLOGICAL DENITRIFICATION OF WATERS

[75] Inventors: Yves Lebesgue, Colombes; Frederic Miglioretti, Chateaubriand, both of France

[73] Assignees: Omnium d'Assainissement, Courbevoie; Argiles & Minereaux, Montguyon, both of France

[21] Appl. No.: 63,110

[22] Filed: Aug. 1, 1979

[30] Foreign Application Priority Data

Aug. 2, 1978 [FR] France .................................. 78 22779

[51] Int. Cl.³ .............................................. C02F 3/28
[52] U.S. Cl. .................................... 210/610; 210/617; 210/903
[58] Field of Search .................. 210/11, DIG. 28, 18; 106/71-73

[56] References Cited

U.S. PATENT DOCUMENTS

| 3,829,377 | 8/1974 | Hashimoato | 210/DIG. 28 |
| 4,001,362 | 1/1977 | Delmon et al. | 106/72 X |
| 4,043,936 | 8/1977 | Francis et al. | 210/DIG. 28 |

OTHER PUBLICATIONS

St. Amant et al., "Treatment of High Nitrate Waters," *Journ. AWWA,* vol. 61, Dec. 1969, pp. 659-662.

*Primary Examiner*—Thomas G. Wyse
*Attorney, Agent, or Firm*—Browdy and Neimark

[57] ABSTRACT

Water is denitrified by passage through a porous bed of fired clay containing 1-5 parts per thousand of Mo, preferably added to the clay before firing in the form of Mo containing acid or an alkaline salt of such acid.

7 Claims, 1 Drawing Figure

PROCESS FOR BIOLOGICAL DENITRIFICATION OF WATERS

FIELD OF INVENTION

This invention relates to the biological treatment of water and, more particularly, to a process for the denitrification of waste water or distribution type water by use of a specific granular material as a biological filter support.

BACKGROUND OF THE INVENTION

For a long time various industries have used, for water treatment, cultures of microorganisms such as bacteria or others which, dispersed in an aqueous medium more or less rich in ionized or non-ionized inorganic elements, are nourished by an organic or inorganic substrate, under well defined operating conditions (aeration or not, temperature, pH, etc.) to perform a certain number of transformations by assimilation and metabolism. For example, according to a now standard water treatment process, microorganisms are used to transform pollutant substances in systems either with activated sludge, in fermentation tanks or ponds or in the form of bacterial beds where the microorganisms are held on a fixed support acting as a filtration layer for the waters to be purified.

In this process of the "fixed bacterial bed" type, various supports can be used that are able to work in an aerobic or anaerobic medium. For example, hydrated silicates such as natural or artificial pozzolanas, or activated carbon, are used. According to a notable improvement, there is specified the use, as the support for holding the microorganisms and for filtration, fired clays (or chamottes) in the form of aggregates containing small amounts of trace elements such as metals of the types: iron, copper, zinc, manganese, cobalt, aluminum, sodium, potassium, calcium, magnesium. These trace elements serve as nutrients for microorganisms and thus it is possible to obtain excellent activation of the biomass whose rate of growth is optimal (French Pat. No. 76.03573 of Feb. 10, 1976).

These fired clays, doped with trace elements, are well suited for biological filtering in an aerobic medium; they actually achieve a spectacular improvement of the nitrification yield (transformation of nitrogen in $NO_3$ by zoogloea or similar type autotrophic bacteria) in comparison with previously known biological filtering processes.

SUMMARY OF THE INVENTION

The invention relates, in the same general field, to the process of water denitrification, i.e., transformation of nitrogen ($NO_3$) into $CO_2$, $H_2O$ and $N_2$ in the presence of organic carbon and denitrifying type heterotrophic bacteria. It aims particularly at developing a fired clay from the above cited group, but which is specifically adapted to anaerobic denitrification treatment.

Actually, it has been found, in a surprising way, during much research, that fired clays such as those used as the base material in the above-referenced French patent, but containing a certain amount of molybdenum, are particularly effective for the operation of denitrification of a water regardless of its nature and origin of the water. Thus, it is an object of the invention to provide a process for biological denitrifcation of water by percolation through a submerged, fixed bed of granular material in anaerobic medium, where there is used as the granular material a fired clay containing 1 to 5 parts by weight per thousand (in relation to the clay) of molybdenum.

DETAILED DESCRIPTION OF EMBODIMENTS

Figure 1:
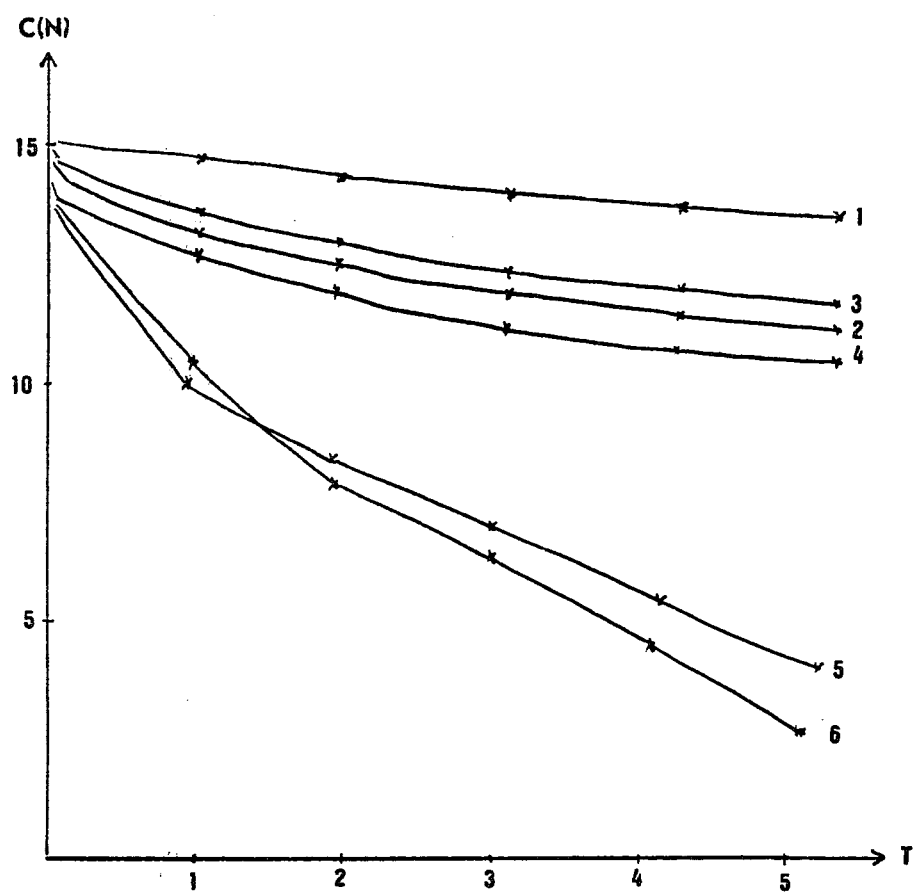
FIG. 1 is a graph of comparative results showing the effect of the present invention, according to the examples.

The fired clay or chamotte support according to the invention can be suitably obtained from natural clays of the types: illite, kaolite, montmorillonite, or mixtures of these products. Addition of molybdenum to these clays, before firing, cannot be done in just any form of this element, as explained below, to obtain the best results. Actually, it was surprisingly found that addition of Mo in metal form to the raw clay did not make it possible to obtain good results in denitrification and that it was necessary to introduce Mo in special forms. Of these, there should be noted particularly: molybdic acid or an alkaline molybdate, for example, sodium or ammonium molybdate.

According to an advantageous embodiment, the chamotte of the invention can further contain other metals, acting as trace elements, such as particularly: iron, manganese and titanium (at a rate of approximately 0.2 to 1.5% by weight in relation to the weight of the clay support).

In practice, the doped supports according to the invention are obtained by mixing raw clay and the additives according to known techniques (in a dry or wet manner) then firing at a temperature above 1000° C., generally on the order of 1200° C. The resulting fired clay is then ground and sifted to the desired granulometries, most often between 1 and 5 mm. When trace elements other than Mo are added, they are generally introduced in the form of oxides, for example, $MnO_2$, $TiO_2$, or FeO.

To use the product of the invention, the operation is performed as indicated above in an anaerobic atmosphere such as in a packed column in the presence of known heterotrophic denitrifying bacteria such as, for example, those of the groups: *Micrococcus denitrificans, Pseudomonas denitrificans,* Denitrobacillus, Spirillum, Paracolobactrum, Alcaligenes, Achromobacter, etc. As is known, elimination of nitrates from water by an anaerobic process implies the addition of a small amount of carbon material to the water to be treated. For this purpose, it is possible to use: an aliphatic alcohol such as methanol, or better, ethanol; an acid such as acetic acid, citric acid or lactic acid; lactoserum; or a sugar such as glucose or products rich in sugar such as sugar beet molasses or the like. Addition of a carbon substance is regulated so that the $C/NO_3$ ratio is generally between 3 and 5. Treatment of the water to be purified is performed continuously on a submerged, fixed bed of the doped support. To capture oxygen from the water, at the beginning of the operation, to be able to work in an anaerobic medium, it is possible, for example, to add sodium sulfite or or similar product to the water. Advantageously, to avoid clogging phenomena, the water to be treated is fed to the column of the granular bed in an ascending manner and countercurrent washings are performed periodically to eliminate the materials caught on the filter. Generally, the linear speed of the water to be treated is between 3 and 12 meters/hour, for a working filter height between 1.60 and 4.50 meters.

According to a variant and another mode of using the process of the invention, it is possible to work in a descending flow of water to be treated on the fixed bed of chamotte doped with molybdenum, optionally accompanied by other trace elements. Of course, other attitudes may be used. In the descending current process, washing cycles and especially the operation of further filtering the treated water can be avoided. Further, the heterotrophic denitrifying bacteria are trapped in the bed; this is, of course, a detriment because of a great clogging of the granular material.

Thanks to the use, as the fixed bed, of a doped support according to the invention, it is possible to eliminate more than 90% of the nitrogen of $NO_3$ in 4 to 5 hours.

The following examples, cited by way of illustration, show how the invention can be put into practice.

EXAMPLES (A) A denitrification series was made on surface waters to make them potable by operating in an anaerobic medium with ascending water flow in columns containing fixed beds of fired clay (chamottes) doped with molybdenum and, optionally, other trace elements. The base raw clay was of the kaolite type and the characteristics of the doped fired clays and of the operations were the following:
granulometry: 1.6 to 4 mm
apparent density (in g/cc): 1.02 to 1.12
height of bed: about 1.70 meters in a cylindrical apparatus 11 cm in diameter
linear speed of water to be denitrified: 3 to 12 m/h.

Doped clays with the following compositions were used:
No. 1: fired clay without trace elements (control sample
No. 2: fired clay containing 5°/00 of Mo and 1% Fe
No. 3: fired clay containing 5°/00 Mo and 1% Mn
No. 4: fired clay containing 5°/00 Mo and 1% Ti
No. 5: fired clay containing 1°/00 Mo (introduced in the form of ammonium molybdate)
No. 6: fired clay containing 5°/00 Mo (introduced in the form of molybdic acid).

Results were obtained, illustrated by the curves in the accompanying drawing, which show the reductions in nitrogen concentration (ordinate C(N)), expressed in mg nitrogen as $NO_3$ per liter of water, as a function of time (abscissa T) expressed in hours. For these tests, the concentration of N in the water was adjusted to 15 mg/l by a solution of $KNO_3$ and dosing were made every hour for five hours.

As can be seen from this graph, an undoped fired clay, used as filtering support, has a negligible effect on denitrification (curve 1). On the other hand, fired clays doped with molybdenum according to the invention (curves 5 and 6) make it possible to cause a considerable drop in the concentration of nitrogen in the treated water since, after five hours, no more than about 2.5 to 4 mg/l of nitrogen ($NO_3$) are found. Clays doped with Mo and further containing trace elements of the Fe, Mn or Ti type also promote denitrification but at a notably lower rate (curves 2, 3, 4). However, it should be noted that, in this latter case, the molybdenum was introduced into the raw clay composition in metal form, therefore, other than that specified for alkaline molybdate.

(B) To illustrate the above mentioned variant of the process of the invention, results are given below which were obtained by treated surfaces waters to make them potable under the same conditions as those indicated in (A) but by operating in a column with descending water flow. The fixed bed was made up of a chamotte doped with molybdenum containing 1.25 per thousand of Mo (introduced in the raw clay in the form of molybdic acid) and with the following characteristics:
granulometry: 2 to 5 mm
apparent density (in g/cc): 1.15
bed height: 1.50 m in a column of about 11 cm in diameter
linear speed of descending water: 2 to 6 m/h
$NO_3$ content of the water to be treated: 120 parts per million Roughly the same results were obtained for reductions of nitrogen concentration as for those corresponding to curve No. 5 of the graph. The reduction of citric nitrogen content was practically 100%. The value of the residual carbon was slight, with a DCO/nitrogen ($NO_3$) ratio on the order of 4.2. Production of mud was on the order of 0.9 kg of nitrogen ($NO_3$) eliminated. Further, the presence of pathogenic bacteria at the biofilter outlet was not detected. The measured count was on the order of $10^4$ bacteria in total for 100 ml water for a linear speed of 2 m/h. The water obtained after treatment was perfectly potable, provided, of course, there was a suitable oxygenation.

It will be obvious to those skilled in the art that various changes may be made without departing from the scope of the invention and the invention is not to be considered limited to what is shown in the drawing and described in the specification.

We claim:

1. A process for the biological denitrification of water in an anaerobic medium by passage of the water to be purified through a submerged, fixed bed of granular material in the presence of heterotrophic denitrifying bacteria, comprising using as the granular material a fired clay containing 1 to 5 parts per thousand in relation to the clay of molybdenum, wherein the fired clay used as denitrification support is obtained by firing at a temperature above 1000° C. a raw clay selected from the group consisting of illite, kaolite, montmorillonite and mixtures thereof and to which has been added, before firing, molybdic acid or alkaline molybdate, the resulting fired clay then being ground and sifted to an average granulometry between 1 and 5 mm.

2. Process according to claim 1 wherein the clay further contains a trace element selected from the group consisting of iron, manganese, titanium and mixtures thereof.

3. A process for the biological denitrification of water in an anaerobic medium by passage of the water to be purified through a submerged, fixed bed of granular material in the presence of heterotrophic denitrifying bacteria, comprising using as the granular material a fired clay containing a trace element selected from the group consisting of iron, manganese, titanium and mixtures thereof, and approximately 1 to 5 parts per thousand in relation to the clay of molybdenum, said molybdenum having been added to said clay before the firing thereof in the form of molybdic acid or an alkaline molybdate.

4. Process according to any of claims 1, 2, or 3 wherein there is added to the water to be treated a carbon source selected from the group consisting of aliphatic alcohol, organic acid, and sugar in such amount that the $C/NO_3$ ratio is between 3 and 5.

5. Process according to claim 4 wherein said carbon source is methanol, ethanol, acetic acid, lactic acid, citric acid, glucose, molasses or lactoserum.

6. Process according to any of claims 1, 2, or 3 wherein the water is purified by passage through said bed at a linear speed between 3 and 12 meters/hour for bed lengths of 1.6 to 4.5 meters.

7. Process according to any of claims 1, 2, or 3 wherein the water treated is surface or underground water to make it potable, or said water is residual, waste or industrial waters.

* * * * *